US009279661B2

(12) United States Patent
Tateno et al.

(10) Patent No.: US 9,279,661 B2
(45) Date of Patent: Mar. 8, 2016

(54) INFORMATION PROCESSING APPARATUS AND INFORMATION PROCESSING METHOD

(75) Inventors: Keisuke Tateno, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 13/538,383

(22) Filed: Jun. 29, 2012

(65) Prior Publication Data

US 2013/0011018 A1   Jan. 10, 2013

(30) Foreign Application Priority Data

Jul. 8, 2011   (JP) .................................. 2011-152031

(51) Int. Cl.
  *G01B 11/00*   (2006.01)
  *B25J 9/16*   (2006.01)
  *G06T 7/00*   (2006.01)

(52) U.S. Cl.
  CPC ............ *G01B 11/002* (2013.01); *B25J 9/1697* (2013.01); *G06T 7/0046* (2013.01);
  (Continued)

(58) Field of Classification Search
  CPC .... B25J 19/023; B25J 9/1697; G01B 11/002; G01B 5/008; G01B 5/014; G06T 7/0046; G06T 2207/10028; G06T 2207/30148; G06T 7/0044; G06T 7/004; G06T 7/001; G06T 2207/30141; G05B 2219/37425; G05B 2219/40548
  See application file for complete search history.

(56) References Cited

U.S. PATENT DOCUMENTS 5,305,427 A * 4/1994 Nagata ................... B25J 19/023
                                                           700/254
5,499,306 A * 3/1996 Sasaki .................... B25J 9/1697
                                                           382/153

(Continued)

FOREIGN PATENT DOCUMENTS

CN         1823256 A    8/2006
CN       101952853 A    1/2011

(Continued)

OTHER PUBLICATIONS

Y. Hel-Or and M. Werman, "Pose estimation by fusing noisy data of different dimensions", IEEE Transactions on Pattern Analysis and Machine Intelligence, vol. 17, No. 2, pp. 195-201, Feb. 1995.

(Continued)

*Primary Examiner* — Manav Seth
(74) *Attorney, Agent, or Firm* — Canon USA Inc. IP Division

(57) ABSTRACT

An information processing apparatus which estimates a three-dimensional position-and-orientation of a measuring object using an imaging apparatus capable of capturing a two-dimensional image and a range image, includes a data storing unit configured to store verification data for estimating a position-and-orientation of a measuring object, a two-dimensional image input unit configured to input a two-dimensional image captured by the imaging apparatus in a first position-and-orientation, a range image input unit configured to input a range image captured by the imaging apparatus in a second position-and-orientation, a position-and-orientation information input unit configured to acquire position-and-orientation difference information which is relative position-and-orientation information in the first position-and-orientation and the second position-and-orientation, and a calculation unit configured to calculate, based on the position-and-orientation difference information, a position-and-orientation of the measuring object so that the verification data for estimating the position-and-orientation matches the two-dimensional image and the range image.

22 Claims, 5 Drawing Sheets

(52) U.S. Cl.
CPC ............... *G05B 2219/37425* (2013.01); *G05B 2219/40548* (2013.01); *G06T 2207/10028* (2013.01); *G06T 2207/30141* (2013.01); *G06T 2207/30148* (2013.01)

(56) References Cited

U.S. PATENT DOCUMENTS

| | | | | |
|---|---|---|---|---|
| 5,570,458 | A | * | 10/1996 | Umeno et al. ................. 700/253 |
| 5,884,239 | A | * | 3/1999 | Romanik, Jr. ........ G01B 11/002 345/158 |
| 5,983,166 | A | * | 11/1999 | Matsumoto .......... G01B 11/002 33/300 |
| 6,816,755 | B2 | * | 11/2004 | Habibi ................... B25J 9/1697 318/568.11 |
| 2004/0190766 | A1 | * | 9/2004 | Watanabe et al. ............. 382/154 |
| 2010/0328682 | A1 | * | 12/2010 | Kotake et al. ................. 356/620 |

FOREIGN PATENT DOCUMENTS

| | | |
|---|---|---|
| JP | 2005-201824 A | 7/2005 |
| WO | 2010/150515 A1 | 12/2010 |

OTHER PUBLICATIONS

R. Y. Tsai, "A versatile camera calibration technique for high-accuracy 3D machine vision metrology using off-the-shelf TV cameras and lenses", IEEE Journal of Robotics and Automation, vol. RA-3, No. 4, pp. 323-344, Aug. 1987.

Kazunori Umeda et al., "3D Shape Recognition by Distributed Sensing of Range Images and Intensty Images", Proceedings of the 1997 IEEE, International Conference on Robotics and Automation, Albuquerque, New Mexico—1997; pp. 149-154, (1997).

Stephen Gould et al., "Integrating Visual and Range Data for Robotic Object Detection", M2SFA2 2008: Workshop on Multi-camera and Multi-modal Sensor Fusion, pp. 1-12, (2008).

* cited by examiner

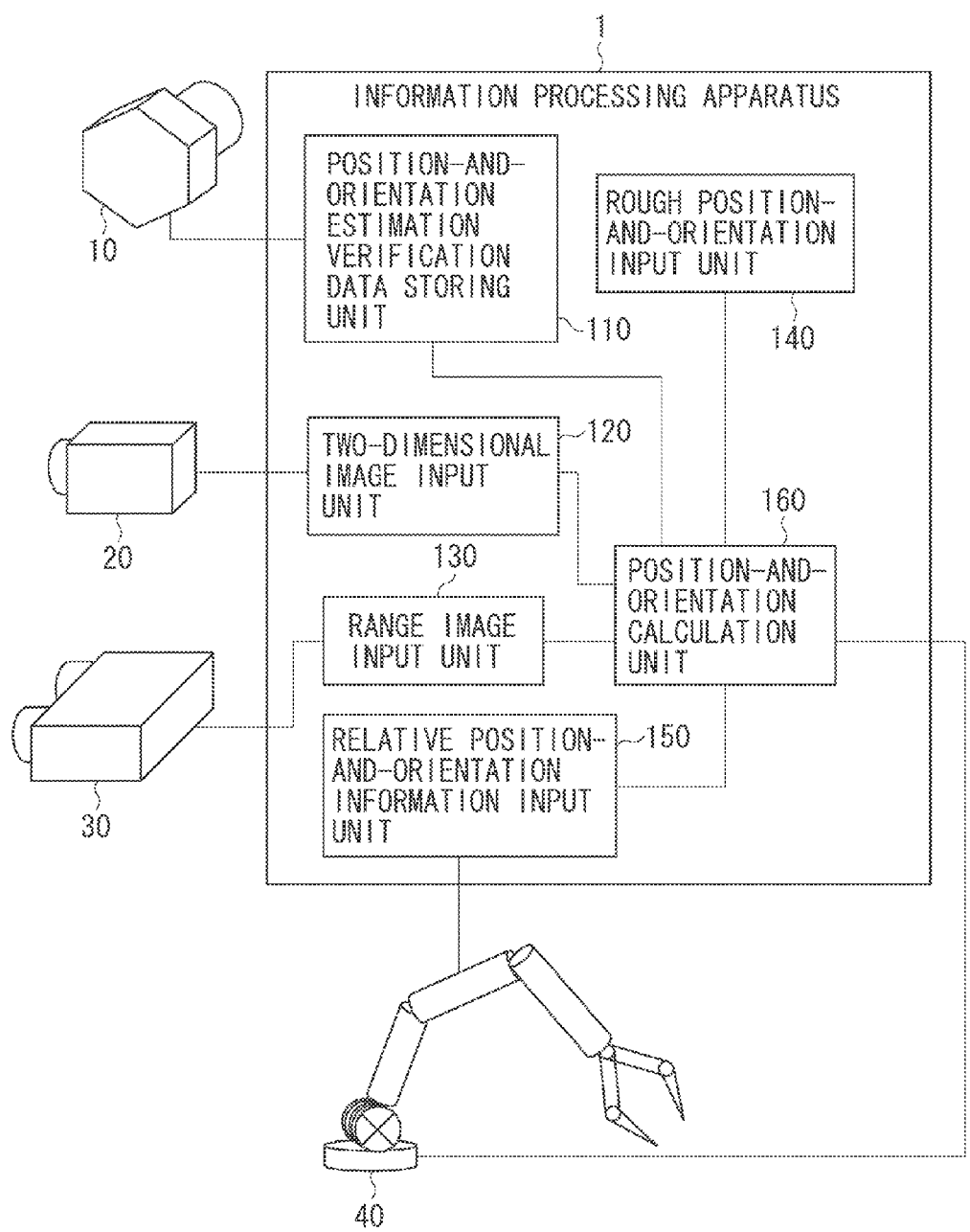

INFORMATION PROCESSING APPARATUS AND INFORMATION PROCESSING METHOD

BACKGROUND OF THE INVENTION

1. Field of the Invention

The present invention relates to an information processing apparatus and an information processing method. In particular, the present invention relates to a technique suitable for measuring a position-and-orientation of an object whose three-dimensional shape is known.

2. Description of the Related Art

Recently, complex tasks such as assemblage of industrial products which have been manually performed are being performed instead by robots. When the robot assembles the industrial product, the robot holds a component by an end effecter such as a hand, so that it becomes necessary to accurately measure relative position-and-orientation between the component and the robot (i.e., robot hand).

Non-patent literature 1 (Y. Hel-Or and M. Werman, "Pose estimation by fusing noisy data of different dimensions", IEEE Transactions on Pattern Analysis and Machine Intelligence, Vol. 17, No. 2, pp. 195-201, 1995) discusses an example of a technique for accurately measuring the position-and-orientation of an object using, at the same time, a two-dimensional image (e.g., a grayscale image or a color image) acquired by a camera and a range image acquired by a distance sensor. According to non-patent literature 1, the position-and-orientation of the object is estimated by viewing a feature on the two-dimensional image as a three-dimensional point in which a depth is uncertain, and using such a two-dimensional image along with a three-dimensional point group in the range image.

Further, non-patent literature 2 (Tateno, Kotake, Uchiyama, "A Model fitting method using intensity and range images for bin-picking applications", 13$^{th}$ Meeting on Image and Recognition Understanding (MIRU2010), OS-1, 2010) discusses a method for accurately measuring the position-and-orientation of an object as follows. An error measured in the two-dimensional grayscale image, and an error measured in a range image space, are optimized at the same time by formulation based on maximum likelihood estimation.

The conventional technique, i.e., the method for estimating the position-and-orientation using both the two-dimensional image and the range image, assumes the following. The conventional technique assumes that a relative positional relation between an imaging apparatus and a measuring target object does not change between when capturing the two-dimensional image and when capturing the range image.

On the other hand, if the range image is captured using a pattern projection method, it is necessary to apply different lighting patterns with respect to the two-dimensional image and the range image. It is thus not possible in principle to capture the grayscale image at the same time as capturing the range image.

As a result, the positional relation between the imaging apparatus and the measuring target object becomes different when capturing the two-dimensional image and when capturing the range image in the following cases. The positional relation becomes different for the case where a moving imaging apparatus mounted on a robot arm measures the position-and-orientation of the object and for the case where the position-and-orientation of the object moving on a conveying belt is measured. If the object position-and-orientation is estimated using the conventional technique as described above, accuracy is reduced and the estimation process cannot be performed.

On the other hand, if the imaging apparatus or the measuring target object is moved using the robot arm, a displacement amount of the imaging apparatus or the measuring target object between when the imaging apparatus captures the respective images can be acquired by referring to motion information of the robot.

For example, Japanese Patent Application Laid-Open No. 2005-201824 discusses a technique referred to as motion stereo. Such a technique uses the displacement amount of the position-and-orientation change amount generated due to the movement between when the images are captured. The position-and-orientation of the measuring target object is thus estimated from a plurality of images whose image capturing time and the position-and-orientation at the image capturing time are different.

However, the conventional motion stereo technique employing robot motion information assumes using only the two-dimensional image. As a result, the technique cannot be applied to the case where the position-and-orientation is estimated using the range image, or both the two-dimensional image and the range image.

SUMMARY OF THE INVENTION

The present invention has been made in consideration of the above situation. The present invention is directed to an information processing apparatus capable of accurately measuring the position-and-orientation of the object using the two-dimensional image and the range image, even when at least one of the relations between the position and the orientation of the imaging apparatus and the measuring target object is changing at high speed.

According to an aspect of the present invention, an information processing apparatus configured to estimate a three-dimensional position-and-orientation of a measuring object using an imaging apparatus capable of capturing a two-dimensional image and a range image, includes a data storing unit configured to store verification data for estimating a position-and-orientation of a measuring object, a two-dimensional image input unit configured to input a two-dimensional image captured by the imaging apparatus in a first position-and-orientation, a range image input unit configured to input a range image captured by the imaging apparatus in a second position-and-orientation, an acquisition unit configured to acquire position-and-orientation difference information which is relative position-and-orientation information between the first position-and-orientation and the second position-and-orientation, and a calculation unit configured to calculate, based on the position-and-orientation difference information, a position-and-orientation of the measuring object so that the verification data for estimating the position-and-orientation matches the two-dimensional image and the range image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration example of an information processing apparatus according to an exemplary embodiment of the present invention.

DESCRIPTION OF THE EMBODIMENTS

Various exemplary embodiments, features, and aspects of the invention will be described in detail below with reference to the drawings.

<An Exemplary Embodiment Using a Hand Eye Robot System>

Figure 2A:
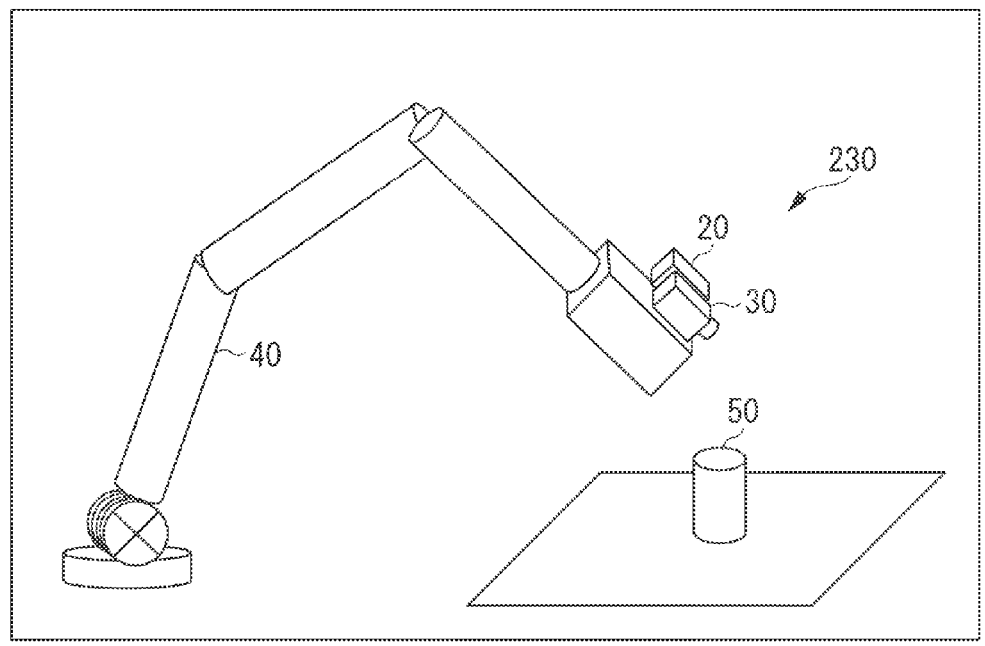
FIGS. 2A and 2B illustrate a relation between a robot arm, an imaging apparatus, and a component to be measured.

According to the present exemplary embodiment, the information apparatus is applied to the object position-and-orientation estimation method in a scene as follows. The robot arm on which the imaging apparatus is mounted at an end tip is moved to capture the image of a fixed measuring object 50 as illustrated in FIG. 2A.

Figure 3:
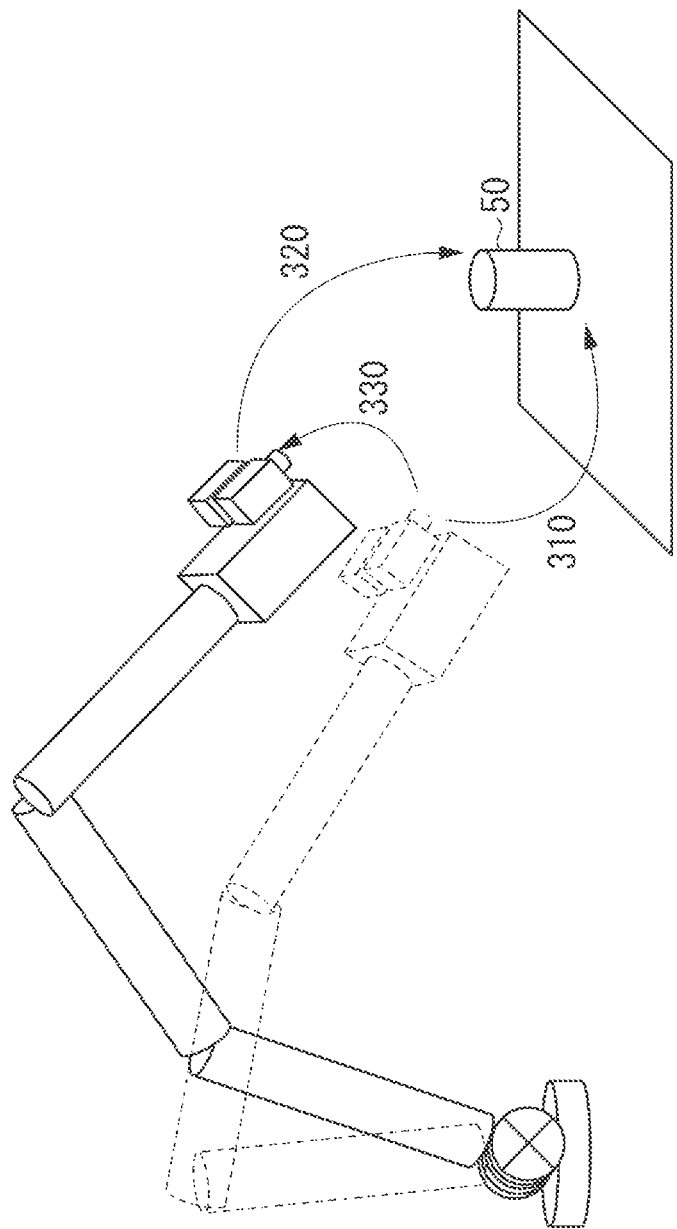
FIG. 3 illustrates the imaging apparatus moving between image capturing times.

According to the present exemplary embodiment, the imaging apparatus captures the grayscale image and then captures the range image for performing one image acquisition. Basically, the imaging apparatus captures the grayscale image at a different time from when measuring the range image. As a result, if the imaging apparatus is moving between times, the relative position-and-orientation between the object and the imaging apparatus becomes different when the imaging apparatus is capturing the two-dimensional image and when capturing the range images. FIG. 3 illustrates such different relative position-and-orientation 310 and relative position-and-orientation 320.

The information processing apparatus thus acquires from the motion information of the robot arm, the position-and-orientation displacement amount of the imaging apparatus moving between capturing the two images. The information processing apparatus then uses the acquired information along with the two-dimensional image and the range image, so that the information processing apparatus accurately estimates the relative position-and-orientation between the imaging apparatus and the measuring object 50.

FIG. 1 illustrates a configuration example of an information processing apparatus 1 according to an exemplary embodiment of the present invention. The information processing apparatus 1 estimates the three-dimensional position-and-orientation of the measuring object using the imaging apparatus capable of capturing the two-dimensional image and the range image.

Referring to FIG. 1, the information processing apparatus 1 includes a position-and-orientation estimation verification data storing unit 110, a two-dimensional image input unit 120, a range image input unit 130, a rough position-and-orientation input unit 140, a relative position-and-orientation information input unit 150, and a position-and-orientation calculation unit 160.

The position-and-orientation estimation verification data storing unit 110 stores position-and-orientation estimation verification data 10, and is connected to the position-and-orientation calculation unit 160. A two-dimensional image capturing apparatus 20 is connected to the two-dimensional image input unit 120. A range image capturing apparatus 30 is connected to the range image input unit 130. A robot 40 is connected to the relative position-and-orientation information input unit 150.

According to the present exemplary embodiment, the information processing apparatus 1 is applicable if the position-and-orientation estimation verification data 10 stored in the position-and-orientation estimation verification data storing unit 110 is suitable for a shape of a viewing object whose image is to be actually captured.

Next, each unit constituting the information processing unit 1 will be described. The position-and-orientation estimation verification data 10 is three-dimensional geometric information indicating the shape of the object to be measured (hereinbelow referred to as a measuring object or simply as an object).

Hereinbelow, the position-and-orientation estimation verification data 10 will be referred to as a three-dimensional shape model. The three-dimensional shape model is defined by information on a plane configured by a collection of points or connecting the points, and information on line segments configuring the plane. The three-dimensional shape model is stored in the position-and-orientation estimation verification data storing unit 110, and input to the position-and-orientation calculation unit 160.

The two-dimensional image capturing apparatus 20 is a camera for capturing normal two-dimensional images which may be a grayscale image or a color image. According to the present exemplary embodiment, the two-dimensional image capturing apparatus 20 outputs the grayscale image. The two-dimensional image captured by the two-dimensional image capturing apparatus 20 in the first position-and-orientation is input to the information processing apparatus 1 via the two-dimensional image input unit 120.

A focal distance and a principal point, and internal parameters such as a lens distortion parameters of the camera are acquired by referring to a specification of the device to be used. Further, the focal distance, the principal point, and the internal parameters of the camera are to be previously calibrated using a method discussed in [R. Y. Tsai, "A versatile camera calibration technique for high-accuracy 3D machine vision metrology using off-the-shelf TV cameras and lenses", IEEE Journal of Robotics and Automation, Vol. RA-3, No. 4, 1987].

The range image capturing apparatus 30 captures the range image in the second position-and-orientation for measuring three-dimensional information of the points on the surface of the measuring object. The range image capturing apparatus 30 then inputs the captured range image to the information processing apparatus 1 via the range image input unit 130. A range sensor which outputs the range image is used as the range image capturing apparatus 30. The range image is an image in which each pixel has depth information.

According to the present exemplary embodiment, a one-shot active type range sensor is used. Such a range sensor irradiates the object with multi-slit lines to which color identifications (IDs) of different wavelength are attached. The range sensor then captures reflected light using the camera, and measures the range employing triangulation.

However, the range sensor is not limited to the above, and may be a time-of-flight type range sensor which uses time-of-flight of light. Further, the sensor may be a passive type sensor which calculates using triangulation the depth of each pixel from the image captured by a stereo camera.

Furthermore, any type of sensor capable of measuring the range image may be used without changing the nature of the present invention. The range image capturing apparatus 30 thus inputs the measured range image to the information processing apparatus 1 via the range image input unit 130.

According to the present exemplary embodiment, an optical axis of the range image capturing apparatus 30 matches the optical axis of the two-dimensional image capturing apparatus 20. Further, the correspondence between each pixel in the grayscale image output from the two-dimensional image capturing apparatus 20 and each pixel in the range image output from the range image capturing apparatus 30 is known.

The robot 40 includes a plurality of movable axes configured of a rotational axis or a translational axis. The robot 40 is a movable device for changing the position-and-orientation of the imaging apparatus including the two-dimensional image capturing apparatus 20 and the range image capturing apparatus 30. Hereinbelow, the device including the two-dimensional image capturing apparatus 20 and the range image capturing apparatus 30 will be referred to as an imaging apparatus 230.

According to the present exemplary embodiment, a robot arm having six-degrees-of-freedom configured of six rotatable axes is used, and the imaging apparatus 230 is mounted on the end tip of the robot arm. The information on the six rotatable axes is input to the information processing apparatus 1 via the relative position-and-orientation information input unit 150.

The position-and-orientation of the imaging apparatus 230 attached to the end tip of the arm, from the end tip of the arm to the imaging apparatus 230, are previously calculated as an offset position-and-orientation of the imaging apparatus 230, and stored as an unchanging value. The position-and-orientation of the imaging apparatus 230 can be calculated by offsetting the position-and-orientation of the end tip of the arm using the offset position-and-orientation.

The device used as the robot 40 is not limited to the above, and may be a vertical articulated robot having seven-degrees-of-freedom, a scalar type robot, or a parallel link robot. The robot may be of any type as long as the robot includes a plurality of movable axes including rotational or translational motion axes, and is capable of acquiring the motion information.

The rough position-and-orientation input unit 140 inputs rough values of the position-and-orientation of the object with respect to the imaging apparatus 230 including the two-dimensional image capturing apparatus 20 and the range image capturing apparatus 30. According to the present exemplary embodiment, the information processing apparatus 1 continuously performs measurement in a direction of a temporal axis. A previous measurement value (i.e., value measured in the previous time) is thus used as the rough position-and-orientation.

However, the method for inputting the rough value of the position-and-orientation is not limited to the above. For example, a time-sequential filter may be used to estimate a speed or an angular speed of the object based on the position-and-orientation measured in the past. A current position-and-orientation may then be predicted from the past position-and-orientation, and the estimated speed and acceleration.

Further, the images of the target object captured in various orientations may be stored as templates, and be used in performing template matching with respect to the input images to roughly estimate the position-and-orientation of the target object. Furthermore, if the position-and-orientation of the object can be measured using other sensors, the output value of the other sensor may be used as the rough value of the position-and-orientation.

The sensor may be a magnetic sensor which measures the position-and-orientation by detecting, using a receiver attached to the object, a magnetic field generated by a transmitter.

Further, the sensor may be an optical sensor which measures the position-and-orientation by using a camera fixed at a scene to capture a marker arranged on the object. Any sensor may be used as long as the sensor is capable of measuring the position-and-orientation in six-degrees-of-freedom. Furthermore, if an approximate position-and-orientation in which the object is placed is previously known, such a value may be used as the rough value.

The relative position-and-orientation input unit 150 inputs the position-and-orientation displacement amount of the robot 40 which has moved between the time at which the imaging apparatus 230 has captured the two-dimensional image and the time at which the imaging apparatus 230 has captured the range image. According to the present exemplary embodiment, the position-and-orientation displacement is calculated from the difference between the position-and-orientation of the end tip of the arm between the above-described image capturing times. The position-and-orientation displacement is calculated in the case where the position-and-orientation of the end tip of the arm can be directly acquired from a control module in the robot 40.

However, the method for calculating the displacement of the imaging apparatus 230 between the image capturing times is not limited to the above. For example, an amount of rotation of each axis is acquired from a rotary encoder provided for each of the movable axes of the robot 40. The position-and-orientation of the end tip of the arm is then calculated from the rotation amount of each axis and a link length of the robot 40, employing forward kinematics calculation. The position-and-orientation displacement of the imaging apparatus 230 disposed at the end tip of the arm can thus be calculated. Any method may be employed as long as the position-and-orientation displacement amount of the end tip of the arm moving between the image capturing times can be calculated.

The position-and-orientation calculation unit 160 performs matching of the three-dimensional shape model to the grayscale image captured by the two-dimensional image capturing apparatus 20 and the range image captured by the range image capturing apparatus 30. The three-dimensional shape model stored in the position-and-orientation estimation verification data storing unit 110 is used in performing matching. The position-and-orientation calculation unit 160 thus measures the position-and-orientation of the measuring object 50. The position-and-orientation calculation process will be described in detail below.

The information processing apparatus 1 includes a computer. The computer includes a main control unit such as a central processing unit (CPU), and a storage unit such as a read-only memory (ROM), a random access memory (RAM), and a hard disk drive (HDD).

Further, the computer may include an input/output unit such as a button, a display, and a touch panel, and may also include a communication unit such as a network card.

The above-described components are connected by a bus, and is controlled by the main control unit executing a program stored in the storage unit.

Figure 4:
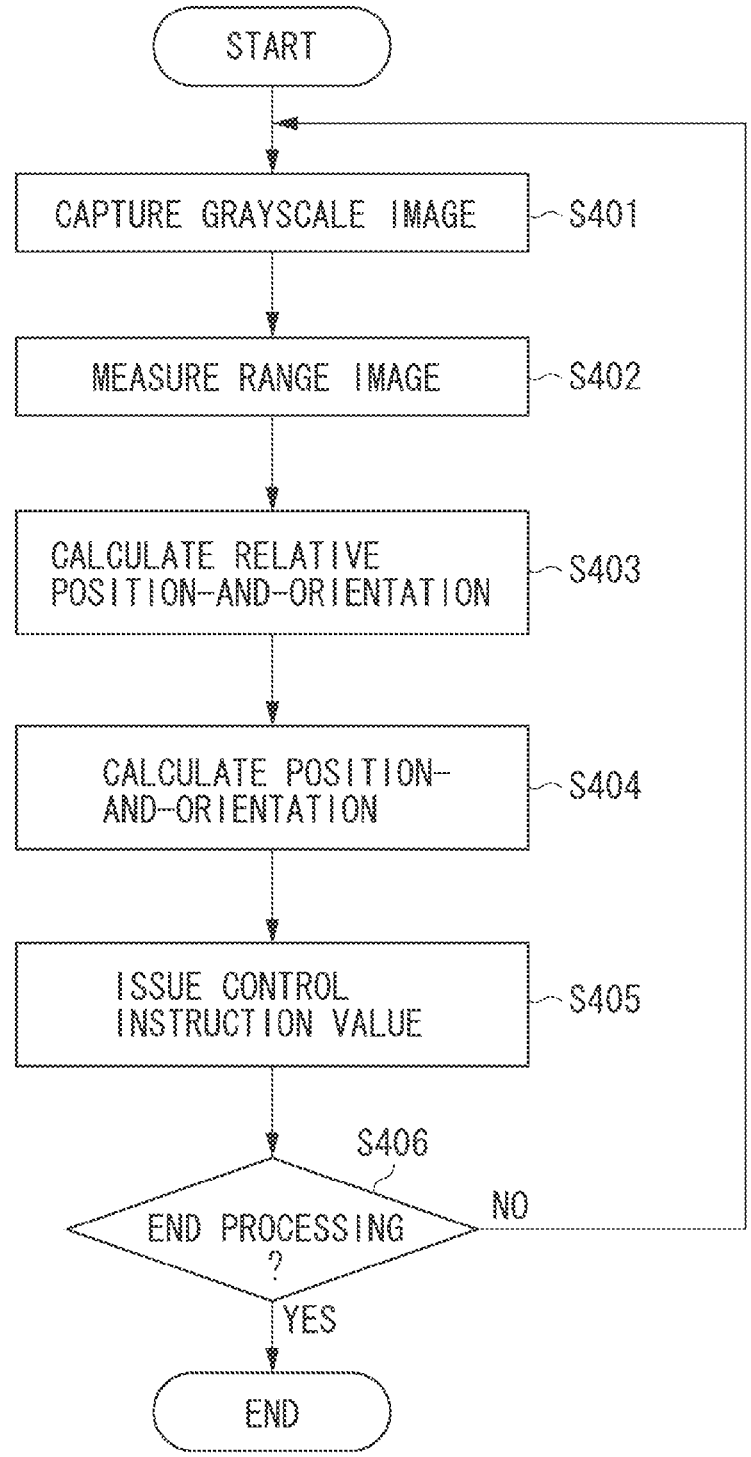
FIG. 4 is a flowchart illustrating a process for performing a position-and-orientation estimation method.

The process for estimating the position-and-orientation according to the present exemplary embodiment will be described below. FIG. 4 is a flowchart illustrating a process for estimating the position-and-orientation according to the present exemplary embodiment.

In step S401, the information processing apparatus 1 captures the grayscale image, and acquires the rough positionand-orientation. According to the present exemplary embodiment, the two-dimensional image capturing apparatus 20 captures the grayscale image. The rough position-and-orientation input unit 140 then inputs to the position-and-orientation calculation unit 160, the rough value of the relative position-and-orientation (position-and-orientation 310 illustrated in FIG. 3) of the imaging apparatus 230 and the object when the two-dimensional image capturing apparatus 20 captures the grayscale image. As described above, according to the present exemplary embodiment, the position-and-orientation measured in the previous time is used as the rough position-and-orientation of the object.

In step S402, the range image capturing apparatus 30 acquires the range image. According to the present exemplary embodiment, the range image contains the distance from the imaging apparatus 230 to the surface of the measuring object 50. As described above, the optical axis of the two-dimensional image capturing apparatus 20 matches the optical axis of the range image capturing apparatus 30, so that the correspondence between each pixel in the grayscale image and each pixel in the range image is known.

In step S403, the information processing apparatus 1 calculates, by using the relative position-and-orientation information input unit 150, the displacement amount of the position-and-orientation of the imaging apparatus 230 which has moved between the image capturing times. More specifically, the information processing apparatus 1 acquires, from the control module in the robot 40 via the relative position-and-orientation information input unit 150, the position-and-orientation of the end tip of the robot arm. The information processing apparatus 1 then offsets the acquired position-and-orientation by the offset position-and-orientation from the end tip of the robot arm to the imaging apparatus 230. As a result, each of the position-and-orientation of the imaging apparatus 230 when the imaging apparatus 230 captures the grayscale image and when the imaging apparatus 230 captures the range image is calculated.

The information processing apparatus 1 then calculates the position-and-orientation displacement amount (position-and-orientation displacement amount 330 illustrated in FIG. 3) of the imaging apparatus 230 between the two image capturing times by acquiring the difference between the position-and-orientation of the imaging apparatus 230 at the two image capturing times. The information processing apparatus 1 applies the calculated position-and-orientation displacement amount to the rough position-and-orientation (position-and-orientation 310 illustrated in FIG. 3) when capturing the grayscale image. The rough position-and-orientation (position-and-orientation 320 illustrated in FIG. 3) when the imaging apparatus 230 captures the range image is thus calculated.

In step S404, the information processing apparatus 1 calculates a correspondence between the grayscale image input in step S401 and the range image input in step S402, and the three-dimensional shape model. The information processing apparatus 1 then calculates the position-and-orientation of the measuring object 50 based on the correspondence result. According to the present exemplary embodiment, the information processing apparatus 1 calculates the position-and-orientation of the measuring object 50 based on the rough value (position-and-orientation 320 illustrated in FIG. 3) of the relative position-and-orientation of the imaging apparatus 230 and the measuring object when capturing the range image, calculated in step S403.

Figure 5:
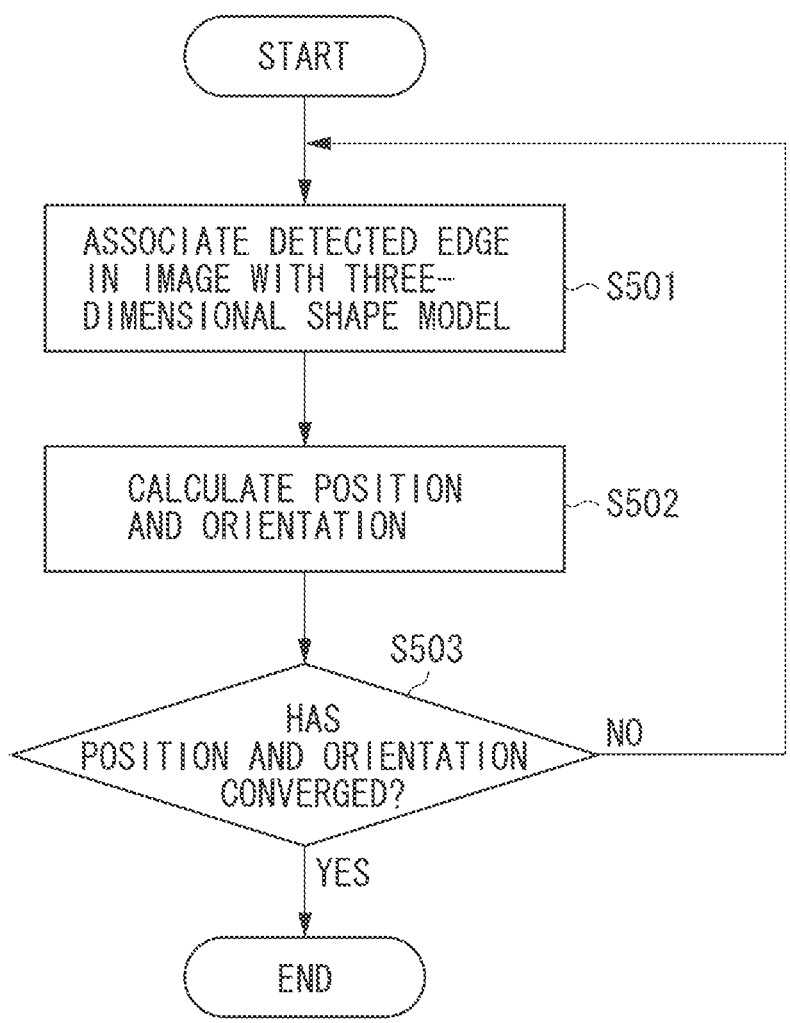
FIG. 5 is a flowchart illustrating a detailed process for calculating the position-and-orientation.

The process for calculating the position-and-orientation performed in step S404 illustrated in the flowchart of FIG. 4 will be described in detail below with reference to the flowchart illustrated in FIG. 5. In step S501, the information processing apparatus 1 associates the three-dimensional point group in the range image measured in step S402 with the three-dimensional shape model, based on the rough position-and-orientation at the time of capturing the range image.

More specifically, the information processing apparatus 1 projects each plane configuring the three-dimensional shape model on the range image, using the rough position-and-orientation of when capturing the range image and the corrected internal parameters of the range image capturing apparatus 30. The information processing apparatus 1 stores the range point group in the range image corresponding to each of the projected planes as the three-dimensional points corresponding to each plane.

The information processing apparatus 1 then associates edges of the grayscale image with the three-dimensional shape model. More specifically, the information processing apparatus 1 subtracts, from the rough position-and-orientation (position-and-orientation 320 illustrated in FIG. 3) of when capturing the range image, the position-and-orientation displacement amount (position-and-orientation displacement amount 330 illustrated in FIG. 3) of the imaging apparatus 230 between the image capturing times calculated in step S403. The information processing apparatus 1 thus calculates the rough position-and-orientation (position-and-orientation 310 illustrated in FIG. 3) of when capturing the grayscale image.

The information processing apparatus 1 then projects each line segment in the three-dimensional shape model on the image using the calculated rough position-and-orientation and the corrected internal parameters of the two-dimensional image capturing apparatus 20. In step S501, the information processing apparatus 1 thus associates the edges detected in the image with the three-dimensional shape model. If the information processing apparatus 1 detects that a plurality of edges is associated with each control point, the information processing apparatus 1 then associates, with the three-dimensional shape model, the edge in the image which is closest to the projected line segment among the plurality of detected edges.

In step S502, the information processing apparatus 1 calculates the position-and-orientation of the measuring object 50. The information processing apparatus 1 calculates based on association data of the edges in the grayscale image associated with each line segment in the three-dimensional shape model, and the three-dimensional points in the range image associated with each plane in the three-dimensional shape model, detected in step S501. In other words, the information processing apparatus 1 updates the position-and-orientation by solving a linear simultaneous equation so that the error between measurement data and the three-dimensional shape model is minimized, based on the calculated association data.

Since scales of a distance in the image and in the three-dimensional space are different, if the simultaneous equation is simply solved, a contribution rate becomes biased to one of the measurement data. To solve such a problem, according to the present exemplary embodiment, the information processing apparatus 1 performs optimization based on maximum likelihood estimation as discussed in non-linear patent literature 2. The information processing apparatus 1 thus estimates the position-and-orientation in which the scales are matched. The method for performing position-and-orientation estimation based on maximum likelihood estimation is not related to the nature of the present invention, so that detailed description is omitted (refer to non-patent literature 2 for details).

The method for calculating the position-and-orientation of the measuring object 50 is not limited to the method discussed in non-patent literature 2. For example, a repetitive operation according to Levenberg-Marquardt method may be performed, or a steepest descent method, which is a simpler method, may be performed. Further, other non-linear optimization calculation methods such as a conjugate gradient method or an incomplete Cholesky-conjugate gradient algorithm may be employed.

In step S503, the information processing apparatus 1 determines whether the position-and-orientation updated in step S502 has converged (i.e., whether it is not necessary to perform repetitive calculation). If the position-and-orientation has not converged (NO in step S503), the association process in step S501 is performed using the updated position-and-orientation.

The information processing apparatus 1 determines that the position-and-orientation has converged if a correction value is proximately 0, or if a difference between square sums of an error vector before and after performing correction is proximately 0. If the position-and-orientation has converged (YES in step S503), the processing ends. The information processing apparatus 1 thus determines the estimation value of the relative position-and-orientation between the imaging apparatus 230 and the measuring object 50.

Returning to the flowchart in FIG. 4, in step S405, the information processing apparatus 1 outputs a control command value to the robot 40 based on the position-and-orientation estimated in step S404. According to the present exemplary embodiment, the information processing apparatus 1 converts, to a value in a robot coordinate system, the difference between the position-and-orientation of the measuring object 50 before performing estimation in step S404 and after performing estimation. The information processing apparatus 1 thus calculates the control command value output to the robot 40.

The information processing apparatus 1 outputs the control command value to the control module in the robot 40, to operate the position-and-orientation for moving the end tip of the arm of the robot 40 to the measuring object 50. Upon outputting the control command value to the robot 40, the processing proceeds to step S406.

In step S406, the information processing apparatus 1 determines whether an input is received to end the position-and-orientation estimation processing. If such an input is received (YES in step S406), the processing ends. If no such input is received (NO in step S406), the process returns to step S401. The information processing apparatus 1 then acquires a new image, and again calculates the position-and-orientation.

As described above, according to the present exemplary embodiment, the position-and-orientation displacement information of the imaging apparatus 230 is acquired from the information on the movable axes of the robot, even when the imaging apparatus 230 moves between times when capturing the two-dimensional image and when capturing the range image. As a result, highly-accurate position-and-orientation estimation can be performed using the two-dimensional image and the range image.

Next, modified examples of the above-described exemplary embodiment will be described below.

<An Example in which the Range Image and the Grayscale Image can be Captured in any Order>

According to the above-described exemplary embodiment, the information processing apparatus 1 captures the range image after capturing the grayscale image. However, there is no particular restriction on the order of performing image capturing, as long as the grayscale image and the range image can be normally captured.

For example, the information processing apparatus 1 may first capture the range image, and then capture the grayscale image. In such a case, the information processing apparatus 1 captures the range image in step S401 illustrated in FIG. 4, and the grayscale image in step S402, in an opposite order as compared to the above-described exemplary embodiment. Similarly, in step S404, the information processing apparatus 1 applies the position-and-orientation displacement amount of the imaging apparatus 230 acquired from the relative position-and-orientation input unit 150 to the rough position-and-orientation acquired when capturing the range image. As a result, the information processing apparatus 1 acquires the rough position-and-orientation of when capturing the grayscale image. This is also in the opposite order as compared to the above-described exemplary embodiment.

As described above, there is no particular limit on the order of capturing the grayscale image and the range image, and the images can be captured in any order.

<An Example in which Only the Range Image is Captured>

According to the above-described exemplary embodiments, the information processing apparatus 1 captures the grayscale image and the range image. However, the information processing apparatus 1 is not limited to the case where the imaging apparatus 1 captures both the grayscale image and the range image.

For example, the imaging apparatus 1 may be applied to a case where the information processing apparatus 1 only captures the range images by changing the time of image capturing. In such a case, the information processing apparatus 1 estimates the position-and-orientation of the measuring object 50 as follows. The information processing apparatus 1 employs the motion information of the robot 40 along with the information on a plurality of range images (i.e., a first range image and a second range image) in which the position-and-orientation is different according to the image capturing times. The configuration of the information processing apparatus 1 in the present modified example is similar to the configuration illustrated in FIG. 1, from which the two-dimensional image capturing apparatus 20 and the two-dimensional image input unit 120 are excluded.

Further, the position-and-orientation estimation process performed according to the modified example is different from that according to the above-described exemplary embodiment in that the information processing apparatus 1 captures the range image instead of the grayscale image in step S401 illustrated in FIG. 4. Further, the process for performing edge detection from the grayscale image in step S404 is replaced by a process for associating the points in the range image with the three-dimensional shape model. Other processes are the same as those according to the above-described exemplary embodiment.

The process in which only the range images are captured also employs the plurality of range images captured while the imaging apparatus 230 has been moving, and the position-and-orientation displacement amount information of the imaging apparatus 230 acquired from the information on the movable axes of the robot 40. Highly-accurate position-and-orientation estimation can thus be performed using the range images captured from a plurality of viewpoints.

<An Example in which the Imaging Apparatus is Fixed and the Target Object Held by the Robot Arm is Moved>

According to the above-described exemplary embodiments, the imaging apparatus 230 is mounted on the end tip of the robot arm as illustrated in FIG. 2A. The information processing apparatus according to the present invention is thus applied to a case where the position-and-orientation of the imaging apparatus 230 changes as a result of the movement of the robot arm.

Figure 2B:
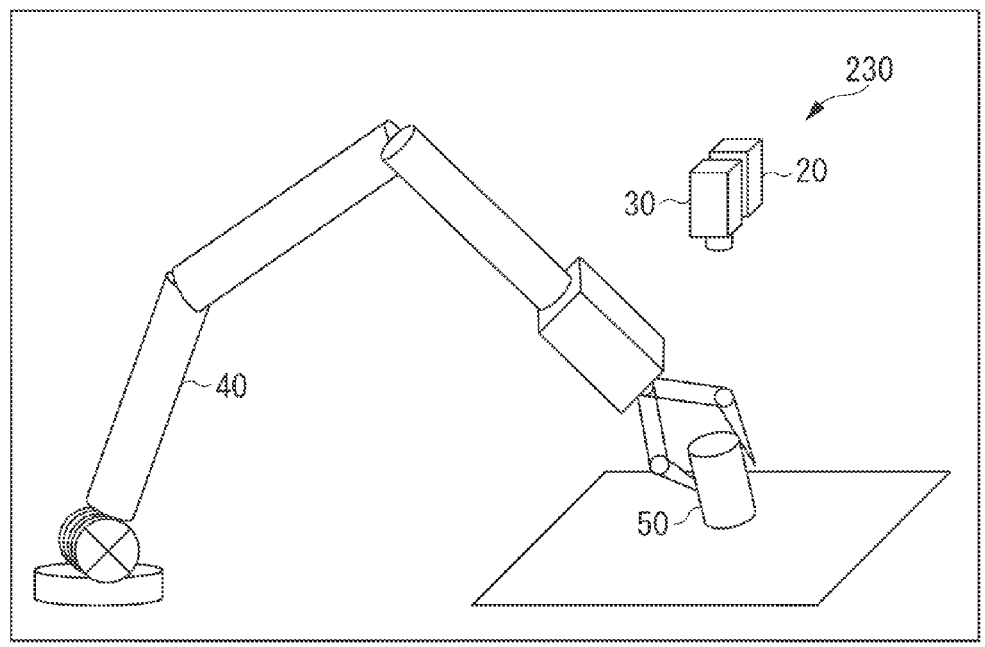

However, the information processing apparatus according to the present invention is not limited to the above-described cases. For example, the information processing apparatus may be similarly applied to a case where the imaging apparatus 230 is fixed, and the target object 50 held by the robot arm is moved along with the movement of the arm, as illustrated in FIG. 2B.

According to the above-described exemplary embodiments, the position-and-orientation displacement amount information acquired from the relative position-and-orientation information input unit 150 in step S403 illustrated in FIG. 4 is the position-and-orientation displacement amount information of the imaging apparatus which is moved when capturing the images.

In contrast, according to the present example, the acquired position-and-orientation displacement amount information is the position-and-orientation displacement amount information of the measuring object 50 which is moved when the image thereof is captured. However, since the position-and-orientation calculated in step S404 is the relative position-and-orientation between the imaging apparatus 230 and the measuring object 50, the process is not different from those according to the above-described exemplary embodiments.

As described above, the information processing apparatus according to the present invention is applicable to both of the cases where the imaging apparatus 230 is moved and the measuring object 50 is fixed, and the imaging apparatus 230 is fixed and the measuring object is moved.

<An Example in which the Position-and-Orientation Estimation Process is Performed after Geometrically Correcting the Range Image>

According to the above-described exemplary embodiments, when the information processing apparatus 1 calculates the position-and-orientation in step S404 illustrated in FIG. 4, the information processing apparatus 1 performs correction based on the position-and-orientation displacement amount between the image capturing times. More specifically, the information processing apparatus 1 corrects the position-and-orientation based on the position-and-orientation displacement amount of the imaging apparatus 230 which is moved between the image capturing times. The information processing apparatus 1 thus corrects the difference in the relative position-and-orientation of the imaging apparatus 230 and the measuring object 50 between when capturing the grayscale image and when capturing the range image. However, the method for performing correction based on the position-and-orientation displacement between the image capturing times is not limited to such a method.

For example, in the case where the information processing apparatus 1 captures the range image and then captures the grayscale image, the following process is performed. The information processing apparatus 1 converts the coordinates of the three-dimensional point group on the surface of the measuring object 50 acquired from the range image to the coordinates based on the position-and-orientation displacement of the imaging apparatus 230 when capturing the grayscale image. The information processing apparatus 1 performs such conversion using the position-and-orientation displacement amount between the image capturing times. The information processing apparatus 1 then performs the association process by applying the method described in non-patent literature 2, and thus calculates the position-and-orientation of the measuring object 50.

As described above, the difference between the relative position-and-orientation of the imaging apparatus 230 and the measuring object 50 when the grayscale image is captured and when the range image is captured may be corrected by correcting the position-and-orientation information. The difference may also be corrected by correcting the coordinates of the measurement data. There is no particular limit on the selection of the method, as long as the method is for performing correction based on the position-and-orientation displacement amount.

<An Example in which it is not Necessary to Perform Position-and-Orientation Estimation Based on Error Minimization>

According to the above-described exemplary embodiments, the information processing apparatus 1 estimates the position-and-orientation by minimizing the error between the edge in the grayscale image and the three-dimensional points in the range image, and the three-dimensional shape model.

However, the method for estimating the position-and-orientation is not limited to the above. For example, the information processing apparatus 1 may previously capture the target object image from various directions, and extract a grayscale template and a range image template with respect to each viewing orientation. The information processing apparatus 1 then performs during a run-time, template matching on the actually captured grayscale image and the range image using the extracted templates. The information processing apparatus 1 thus estimates the position-and-orientation of the target object.

In such a case, the information processing apparatus 1 adds similarity with respect to the grayscale image to the similarity with respect to the range image to calculate the similarity in the template matching process. The information processing apparatus 1 thus performs template matching using both the grayscale image and the range image. If the information processing apparatus 1 is to perform matching with respect to the grayscale image, the information processing apparatus 1 corrects, previous to performing template matching, the rough position-and-orientation to acquire the position-and-orientation (position-and-orientation 310 illustrated in FIG. 3) when the grayscale image is captured. The information processing apparatus 1 then performs template matching.

<An Example in which Obtaining Moving Motion of an Imaging Apparatus is not Limited to Using Robot Motion Information>

In the above-mentioned embodiment, Between the imaging time of the two-dimensional image and the imaging time of the range image, as a method for calculating the position-and-orientation subtraction amount of moving of the imaging apparatus 230, the method for calculating the position-and-orientation subtraction amount from subtraction of the arm tip position-and-orientation of robot 40 in the imaging time interval is described.

However, the method for calculating the moving amount of imaging apparatus 230 is not limited to the method using robot motion information.

For example, attaching a physical sensor measuring the six-degrees-of-freedom-position-and-orientation of a magnetic sensor, an ultrasound sensor, and so on to the imaging apparatus 230, by using the measurement result, position-and-orientation subtraction amount in the imaging time interval may be calculated.

If the moving of imaging apparatus 230 in the imaging interval is limited to the rotational motion, attaching a gyro sensor to imaging apparatus 230, only the rotational subtraction amount may be measured. As far as position-and-orientation subtraction amount of the imaging apparatus 230 in the imaging time interval is calculated, any kind of method may be used.

<An Example to Operate the Work Object by Robot>

In the above-mentioned embodiment, the method for calculating the three-dimensional position-and-orientation of the fixed measuring object 50 by the imaging apparatus attached to arm tip of the robot 40 is explained.

However, the function of the information processing apparatus 1 is not limited to calculating three-dimensional position-and-orientation of the work object, by using the calculated position-and-orientation, the robot 40 may operate the work object. For example, attaching the end effecter capable of grasping the work object to arm tip of robot 40, the robot 40 may grasp the work object.

In this case, As the end effecter, the hand operated by the motor-driving or the adsorption pad adsorbing the work object may be used. As far as an appropriate device about operation for the work object is selected, the selection of the end effecter is not limited.

The calibration of relative position-and-orientation of the robot arm and the end effecter is made by common technique before the enforcement of this embodiment. By this, it is possible to translate the position-and-orientation calculated by position-and-orientation calculation unit 160 into the work space coordinate system which is fixed to the space having the palette.

Furthermore, it becomes possible to control the robot 40 so that the hand is set to the position-and-orientation pointed in the work space coordinate system. As operation of the end effecter for the work object, imposition work of the measuring object 50, surface inspection, and the other work may be operated. The work of the robot 40 for the measuring object 50 is not limited.

Further, if the information processing apparatus 1 is to perform matching with respect to the range image, the information processing apparatus 1 corrects the rough position-and-orientation using the position-and-orientation displacement amount (position-and-orientation displacement amount 330 illustrated in FIG. 3) generated by moving between image capturing times. The information processing apparatus 1 thus acquires the position-and-orientation (position-and-orientation 320 illustrated in FIG. 3) when the range image is captured, and performs template matching. The method for estimating the position-and-orientation is not limited to the above-described methods. Any method may be employed as long as the position-and-orientation of the target object or the imaging apparatus can be estimated based on the grayscale image and the range image.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-152031 filed Jul. 8, 2011, which is hereby incorporated by reference herein in its entirety.

What is claimed is:

1. An information processing apparatus comprising:
a data storing unit configured to store data, indicating a shape of an object to be measured, for estimating a position-and-orientation of the object;
an approximate position-and-orientation obtaining unit configured to obtain an approximate position-and-orientation of the object;
a first image input unit configured to input a first image including the object, captured by a movable imaging apparatus at a first time;
a first obtaining unit configured to obtain a first position-and-orientation of the movable imaging apparatus when the first image is captured;
a second image input unit configured to input a second image captured by the movable imaging apparatus at a second time being different from the first time;
an acquisition unit configured to acquire relative position-and-orientation information between the first position-and-orientation and a second position-and-orientation, wherein the second position-and-orientation is a position-and-orientation of the movable imaging apparatus when the second image is captured;
a second obtaining unit configured to obtain the second position-and-orientation of the movable imaging apparatus based on the first position-and-orientation and the relative position-and-orientation information;
an association unit configured to associate the data indicating the shape of the object with the object included in the first image based on the first position-and-orientation of the movable imaging apparatus and the approximate position-and-orientation of the object and associate the data indicating the shape of the object with the object included in the second image based on the second position-and-orientation of the movable imaging apparatus and the approximate position-and-orientation of the object; and
a calculation unit configured to calculate a position-and-orientation of the object, based on a result of the association unit,
wherein the data storing unit, the approximate position-and-orientation obtaining unit, the first image input unit, the first obtaining unit, the second image input unit, the acquisition unit, the second obtaining unit, the association unit, and the calculation unit are implemented by at least one processor in the information processing apparatus.

2. An information processing apparatus comprising:
a data storing unit configured to store data, indicating a shape of an object to be measured, for estimating a position-and-orientation of the object;
a first image input unit configured to input a first image captured by an imaging apparatus at a first time, wherein a position of the imaging apparatus is fixed;
an approximate position-and-orientation obtaining unit configured to obtain, as a first position-and-orientation of the object, an approximate position-and-orientation of the object, when the first image is captured by the imaging apparatus;
a second image input unit configured to input a second image captured by the imaging apparatus at a second time being different from the first time;
an acquisition unit configured to acquire relative position-and-orientation information between the first positionand-orientation of the object and a second position-and-orientation of the object, wherein the second position-and-orientation of the object is a position and orientation of the object when the second image is captured;

an association unit configured to associate the data indicating the shape of the object with the object included in the first image based on the first position-and-orientation of the object and a position-and-orientation of the imaging apparatus, and associate the data indicating the shape of the object with the object included in the second image based on the second position-and-orientation of the object and the position-and-orientation of the imaging apparatus; and a calculation unit configured to calculate, based on a result of the association unit, a position-and-orientation of the object, wherein the first image input unit, the approximate position-and-orientation obtaining unit, the second image input unit, the acquisition unit, the association unit, and the calculation unit are implemented by at least one processor in the information processing apparatus.

3. The information processing apparatus according to claim 1, wherein the acquisition unit includes a sensor configured to acquire at least one of a position and an orientation, and acquire the relative position-and-orientation information from movable axis information of a robot including a movable axis configured of at least one of a rotational axis and a translational axis.

4. The information processing apparatus according to claim 1, further comprising a position-and-orientation operation unit configured to change, based on the position-and-orientation of the object calculated by the calculation unit, a position-and-orientation of the object or the movable imaging apparatus using a robot including a plurality of movable axes each configured of at least one of a rotational axis and a translational axis.

5. An information processing method comprising:
storing data, indicating a shape of an object to be measured, for estimating a position-and-orientation of the object;
obtaining an approximate position-and-orientation of the object;
inputting a first image including the object, captured by a movable imaging apparatus at a first time;
obtaining a first position-and-orientation of the movable imaging apparatus when the first image is captured;
inputting a second image captured by the movable imaging apparatus at a second time being different from the first time;
acquiring relative position-and-orientation information between the first position-and-orientation and a second position-and-orientation, wherein the second position-and-orientation is a position-and-orientation of the movable imaging apparatus when the second image is captured;
obtaining the second position-and-orientation of the movable imaging apparatus based on the first position-and-orientation and the relative position-and-orientation information;
associating the data indicating the shape of the object with the object included in the first image based on the first position-and-orientation of the movable imaging apparatus and the approximate position-and-orientation of the object and associate the data indicating the shape of the object with the object included in the second image based on the second position-and-orientation of the movable imaging apparatus and the approximate position-and-orientation of the object; and calculating a position-and-orientation of the object, based on a result of the associating.

6. An information processing method comprising:
storing data, indicating a shape of an object to be measured, for estimating a position-and-orientation of the object;
inputting a first image captured by an imaging apparatus at a first time, wherein a position of the imaging apparatus is fixed;
obtaining, as a first position-and-orientation of the object, an approximate position-and-orientation of the object, when the first image is captured by the imaging apparatus;
inputting a second image captured by the imaging apparatus at a second time being different from the first time;
acquiring relative position-and-orientation information between the first position-and-orientation and a second position-and-orientation of the object, wherein the second position-and-orientation of the object is a position and orientation of the object when the second image is captured;
associating the data indicating the shape of the object with the object included in the first image based on the first position-and-orientation of the object and a position-and-orientation of the imaging apparatus and associate the data indicating the shape of the object with the object included in the second image based on the second position-and-orientation of the object and the position-and-orientation of the imaging apparatus; and
calculating, based on the associating, a position-and-orientation of the object.

7. A non-transitory computer-readable storage medium storing a program for causing a computer to execute an information processing method comprising:
storing data, indicating a shape of an object to be measured, for estimating a position-and-orientation of the object;
obtaining an approximate position-and-orientation of the object;
inputting a first image including the object, captured by a movable imaging apparatus at a first time;
obtaining a first position-and-orientation of the movable imaging apparatus when the first image is captured;
inputting a second image captured by the movable imaging apparatus at a second time being different from the first time;
acquiring relative position-and-orientation information in the first position-and-orientation and a second position-and-orientation;
obtaining the second position-and-orientation of the movable imaging apparatus based on the first position-and-orientation and the relative position-and-orientation information;
associating the data indicating the shape of the object with the object included in the first image based on the first position-and-orientation of the movable imaging apparatus and the approximate position-and-orientation of the object, and associating the data indicating the shape of the object with the object included in the second image based on the second position-and-orientation of the movable imaging apparatus and the approximate position-and-orientation of the object; and
calculating a position-and-orientation of the object, based on a result of the associating.

8. A non-transitory computer-readable storage medium storing a program for causing a computer to execute an information processing method comprising:
storing data, indicating a shape of an object to be measured, for estimating a position-and-orientation of the object;

inputting a first image captured by an imaging apparatus at a first time, wherein a position of the imaging apparatus is fixed;

obtaining, as a first position-and-orientation of the object, an approximate position-and-orientation of the object, when the first image is captured by the imaging apparatus;

inputting a second image captured by the imaging apparatus at a second time being different from the first time;

acquiring relative position-and-orientation information between the first position-and-orientation and a second position-and-orientation of the object, wherein the second position-and-orientation of the object is a position and orientation of the object when the second image is captured;

associating the data indicating the shape of the object with the object included in the first image based on the first position-and-orientation of the object and a position-and-orientation of the imaging apparatus and associate the data indicating the shape of the object with the object included in the second image based on the second position-and-orientation of the object and the position-and-orientation of the imaging apparatus; and calculating, based on the associating, a position-and-orientation of the object.

9. The information processing apparatus according to claim 2, wherein the acquisition unit includes a sensor configured to acquire at least one of a position and an orientation, and acquire the relative position-and-orientation information from movable axis information of a robot including a movable axis configured of at least one of a rotational axis and a translational axis.

10. The information processing apparatus according to claim 2, further comprising a position-and-orientation operation unit configured to change, based on the position-and-orientation of the object calculated by the calculation unit, a position-and-orientation of the object or the movable imaging apparatus using a robot including a plurality of movable axes each configured of at least one of a rotational axis and a translational axis.

11. The apparatus according to claim 1, wherein the first image is a two-dimensional image and the second image is a range image.

12. The apparatus according to claim 1, wherein the movable imaging apparatus is attached on a robot arm.

13. The apparatus according to claim 2, wherein the first image is a two-dimensional image and the second image is a range image.

14. An information processing apparatus comprising:

a model data obtaining unit configured to obtain model data of an object to be measured and to be held by a holding unit, wherein the model data includes a first feature of the object and a second feature of the object, wherein the second feature is different from the first feature;

a first image input unit configured to input a first image obtained by a first imaging apparatus at a first time;

a first obtaining unit configured to obtain a first approximate relative position and orientation information between the first imaging apparatus and the object at a first time;

a second image input unit configured to input a second image obtained by a second imaging apparatus at a second time being different from the first time, wherein the second image includes information different from the first image;

a second obtaining unit configured to obtain a second approximate relative position and orientation between the second imaging apparatus and the object based on the first approximate relative position and orientation and information by a controller of a robot arm;

an association unit configured to associate the first feature with a feature included in the first image based on the first approximate relative position and orientation information and associate the second feature with a feature included in the second image based on the second approximate relative position and orientation information; and a calculation unit configured to calculate a position and orientation of the object, based on a result of the association unit, wherein the model data obtaining unit, the two-dimensional image input unit, the first obtaining unit, the second image input unit, the second obtaining unit, the association unit, and the calculation unit are implemented by at least one processor in the information processing apparatus.

15. The apparatus according to claim 14, wherein the first image is a first image indicating a texture of the object and the second image is a range image including distances to the object.

16. The apparatus according to claim 15, wherein the first feature indicates a line segment constituting the object and the second feature indicates a surface of the object.

17. The apparatus according to claim 15, wherein the first feature indicates a surface of the object and the second feature indicates a line segment constituting the object.

18. The apparatus according to claim 14, wherein the first image is a range image including distances to the object and the second image is a second image indicating a texture of the object.

19. The apparatus according to claim 14, wherein the first imaging apparatus and the second imaging apparatus are attached to the robot arm.

20. The apparatus according to claim 14, wherein positions of the first imaging apparatus and the second imaging apparatus are fixed.

21. The apparatus according to claim 14, wherein the first imaging apparatus obtains a first image indicating a texture of the object and the second imaging apparatus obtains a range image including distances to the object.

22. The apparatus according to claim 14, wherein the first imaging apparatus obtains a range image including distances to the object and the second imaging apparatus obtains a second image indicating a texture of the object.

* * * * *